United States Patent [19]

Niwa et al.

[11] 4,446,250

[45] May 1, 1984

[54] PLATE CATALYST BODY FOR DENITRATION

[75] Inventors: Senji Niwa, Kakogawa; Takuji Sasaki, Hyogo; Masaaki Shinto, Akashi; Noriaki Imamura, Kobe, all of Japan

[73] Assignee: Kawasaki Jukogyo Kabushiki Kaisha, Japan

[21] Appl. No.: 368,319

[22] Filed: Apr. 14, 1982

[30] Foreign Application Priority Data

Apr. 20, 1981 [JP] Japan ................................... 56-59952

[51] Int. Cl.³ ........................ B01J 21/06; B01J 23/86; B01J 35/02
[52] U.S. Cl. .................................... 502/309; 502/350; 502/527
[58] Field of Search ................... 252/477 R; 502/309, 502/350, 527

[56] References Cited

U.S. PATENT DOCUMENTS 3,944,505  3/1976  LaCroix ........................... 252/477 R
4,233,183  11/1980  Inaba et al. ...................... 252/477 R

FOREIGN PATENT DOCUMENTS 1199404  7/1970  United Kingdom .

OTHER PUBLICATIONS

"CEER Chemical Economy and Engineering Review", Dec. 1975, Chemical Economy Research Institute (Japan).

Primary Examiner—W. J. Shine
Attorney, Agent, or Firm—Leydig, Voit, Osann, Mayer and Holt, Ltd.

[57] ABSTRACT

A plate catalyst body for denitration wherein a catalytic substance is supported on a porous metallic plate body having three dimensional network, which has an excellent retention of catalyst and an easy producibility, the porous metallic plate body being able to be uneven or have protrusions.

6 Claims, 3 Drawing Figures

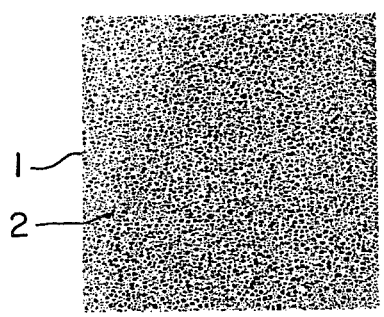 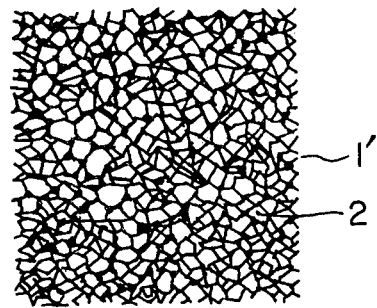
FIG.1A  FIG.1B
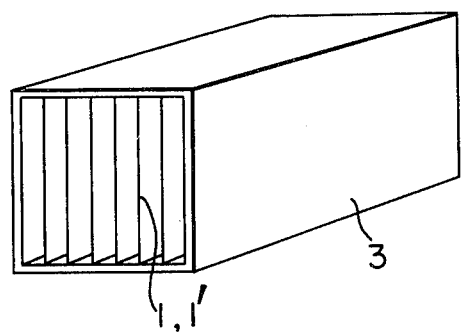
FIG. 2

PLATE CATALYST BODY FOR DENITRATION

This invention relates to a plate catalyst body suitable for catalytic denitration, having an excellent retention of catalytic substances.

Besides pellet form of catalysts, so-called dust-resistant catalysts, prepared in the form of pipe, honeycomb, or plate, have hitherto been used as highly active, $SO_x$-resistant catalysts for treating exhaust gases to remove nitrogen oxides therefrom.

Pellet form catalyst, although advantageous in their possibilities of taking a large surface area per unit volume of catalyst and a high space velocity, have a drawback in that dusts in treatment gas may deposit in the layer of catalyst pellets and clog it.

Dust-resistant catalysts are those developed to eliminate such a drawback as of pellet form catalysts. In particular, catalysts in plate form are useful as a catalyst body because the face to face spacing of catalysts can be freely set and the pressure loss of treated gas is reducible.

Dust-free catalyst bodies of plate form are classified into three types: a kneaded type prepared by mixing and molding catalytic active substances per se into plates, an impregnated type prepared by impregnating molded plates of catalyst carrier with catalytic active substances, and a coated type prepared by coating supporting plates with catalytic active substances.

Since the kneaded type and the impregnated type are poor in strength, the coated type is advantageous in practical use. However, this type involves a disadvantage in the tendency of catalytic substances to peel off under service because metals are generally used as supporting plates, which are significantly different from the catalytic substances in their thermal expansion coefficients, the adhesion of catalytic substances to supporting metallic plates is weak, and the metal interface is corroded with anhydrous sulfuric acid incidentally produced on catalyst surface.

This invention has been accomplished as a result of intense studies by the present inventors for the purpose of providing a plate form of denitration catalyst body, free from the above-described drawbacks of the prior art catalysts, excellent in the retention of catalytic substances, highly active, and easy to produce. The present plate catalyst body is produced by supporting catalytic substances on a porous metallic plate having a three-dimensional network (referred to as "foamed metallic plate" in this invention).

Said foamed metallic plate has a three-dimensional network-like sponge, in which spongy cells are all connected together (open-cell structure).

BRIEF DESCRIPTION OF THE DRAWINGS

In the accompanying drawings,

FIG. 1A shows the structure of an embodiment of foamed metallic plates used in this invention, FIG. 1B is an enlarged view of the three-dimensional network of the foamed metallic plate of FIG. 1A, and FIG. 2 is the illustration of an embodiment of integrated catalyst unit comprising a case and plate catalyst bodies of this invention contained therein, wherein 1 or 1' represents plate catalyst bodies, 2 represents spongy cells, and 3 is an integrated catalyst unit.

Forms of the foamed metallic plates of this invention include those of flat plate, corrugated plate having unidirectional protrusions, and rugged plate having two-directional protrusions or numerous separate protrusions throughout the surface, which are all referred to as plate catalyst bodies in this invention.

Metallic materials for use as the foamed metallic plate in this invention include various kinds of metal such as iron, aluminum, nickel, and chromium, and alloys of these metals, being not particularly limited. Foamed metallic plates may also be subjected, before introduction of catalytic substances, to a surface treatment such as acid treatment, phosphating, chromating, or enamel treatment. Procedures for making such porous, foamed metallic plate are known and exemplary procedures are disclosed in British Pat. No. 1,199,404 and in *CEER Chemical Economy and Engineering Review*, published December 1975 by Chemical Economy Research Institute (Japan). The pore sizes and characteristic three-dimensional network are fully described in said British Patent and published article.

Pore sizes in average pore diameter of the foamed metallic plate used in this invention are 0.1 to 10 mm, preferably 0.5 to 3 mm, these sizes being effective. When the pore size is less than 0.1 mm, catalytic substances applied cannot enter pores of the plate, so that such a plate cannot be used as the catalyst supporting material. When the pore size exceeds 10 mm, the supported catalytic substance layer is liable to peel off from the spongy cell walls, so that such a plate is unsuited for the catalyst support. Effective porosities of the plate are 50 to 95%, preferably 70 to 90%.

Suitable thickness of the foamed metallic plate ranges from 0.5 to 20 mm, preferably from 1 to 5 mm. The thickness, if less than 0.5 mm, is too small to support catalytic substances securely, and if it exceeds 20 mm, increases the pressure loss excessively, markedly detracting beneficial effects of the plate catalyst body for denitration, so that use of such a thick plate is unsuited.

The pore diameter, porosity, and thickness of the plate catalyst body for denitration can be properly chosen by taking into account the stiffness of the body and/or other requirements for it, for example, the degree of pressure loss.

Catalytic substances to be supported on the foamed metallic plate include various carriers and active metal compounds; for example, there are used $TiO_2$ as a carrier and one or more oxides of vanadium (V), tungsten (W), tin (Sn), molybdenum (Mo), and iron (Fe), as active metal compounds.

The plate catalyst body for denitration of this invention is produced as follows: a mixture of a carrier and active substances to be carried is kneaded with a binder such as gypsum or clay, and dispersed in water and/or a water-miscible organic solvent to form a slurry; the slurry is coated on the above-mentioned foamed metallic plate by roller coating or the like, or the foamed metallic plate is dipped in said slurry, and the coated catalyst body is dried and baked.

The plate catalyst body for denitration thus produced of this invention has an excellent retention, causing no peeling of catalytic substances because they are enclosed by the foamed metallic plate; the catalyst body is superior in mechanical strength and advantageous in pressure loss and activity since it comprises a thin supporting plate coated with a thin film of catalytic substances; it results in almost no deposition of contaminating substances such as dust, thus being markedly useful in practical applications.

In addition, the present plate catalyst body is simple in form in the production process, easy to handle inasmuch as it is light and tough, and economical because it requires small amounts of catalytic active substances, thus having various beneficial effects.

This invention will be illustrated referring to the following Example:

EXAMPLE

Foamed nickel-chromium alloy plate of 1 mm in average pore diameter, 85% in porosity, and 1.5 mm in thickness was dipped in a slurry prepared by mixing 40 wt% of $TiO_2$, 5 wt% of $V_2O_5$, 5 wt% of $WO_3$, and suitable amounts of silica gel and of water, to form a catalyst layer on the internal surface of foamed metallic plate. This plate, after drying, was baked at 450° C. for 2 hours. Thus, a plate form of $TiO_2$-based denitration catalyst body was obtained each of which consists of a foamed metallic plate and $TiO_2$-based catalytic substances supported thereon.

These catalyst bodies do not result in peeling of the catalytic substances even when flexed repeatedly, having an excellent retention of catalytic substances.

Catalyst bodies obtained (1 or 1' in FIG. 2) were contained in a case as shown in FIG. 2 to assemble an integrated catalyst unit, wherein every interval between plate centers was 10 mm. This catalyst unit was attached to a reactor so that treatment gas might flow parallel to the plate catalyst bodies' faces, and a gas having a composition as shown in Table 1 was passed through the unit at an area velocity of 15 Nm/hr and a temperature of 380° C., to determine the percentage of denitration.

TABLE 1

| NO | 150 ppm | $O_2$ | 4% |
|---|---|---|---|
| $NH_3$ | 150 ppm | $H_2O$ | 10% |
| $CO_2$ | 8% | $N_2$ | Balance |

The results indicated a denitration percentage of 92%; thus these plate catalyst bodies have proved to have a markedly high activity.

Further, this integrated catalyst unit was subjected to the same test reaction for 100 hours. As a result, no peeling of catalytic substances was observed.

It has been confirmed by the present inventors that similar results were given by plate catalyst bodies for denitration prepared in the same manner as described above, using other denitration catalyst substances than $TiO_2$-based ones.

What is claimed is:

1. A foamed metallic plate catalyst body for denitration having pores with average pore diameters of about 0.1 mm to about 10 mm and a thickness of about 0.5 mm to about 20 mm and including a mixture of $TiO_2$ carrier and a catalytic substance supported by the foamed metallic plate body.

2. The foamed metallic plate catalyst body for denitration according to claim 1, wherein the metallic plate body is nickel-chromium alloy plate.

3. An integrated catalyst unit comprising a plurality of spaced foamed metallic plates, each having a mixture of $TiO_2$ carrier and a catalytic substance supported thereon, said plates each having an effective porosity of 70 percent to 90 percent and a thickness of 1 mm to 5 mm before catalytic substance addition.

4. An integrated catalyst unit according to claim 3 wherein each plate has a thickness of about 1.5 mm and a porosity of about 85 percent before catalytic substance addition, and wherein the spacing interval in the unit between plate centers is about 10 mm.

5. The foamed metallic plate catalyst body for denitration according to claim 1 wherein said foamed metallic plate has pores having average pore diameters of about 0.5 mm to about 3 mm.

6. The foamed metallic plate catalyst body for denitration according to claim 1 wherein the thickness of the foamed metallic plate is within the range of about 1 mm to about 5 mm.

* * * * *